A. T. DAWSON & G. T. BUCKHAM.
ORDNANCE BREECH MECHANISM.
APPLICATION FILED JAN. 18, 1918.
1,300,356.
Patented Apr. 15, 1919.
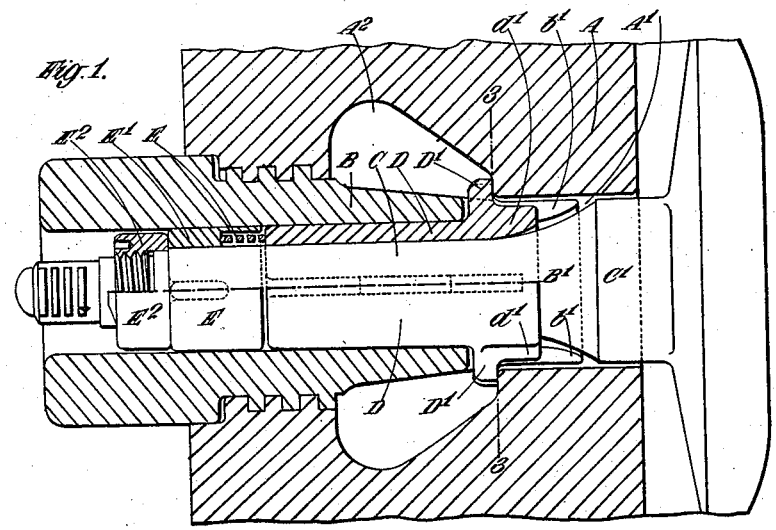
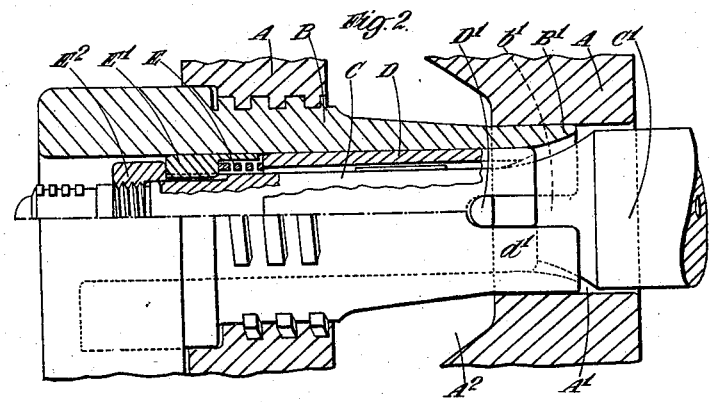
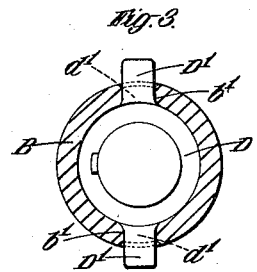
Arthur Trevor Dawson and George Thomas Buckham,
Inventors.
By Pennie, Davis, Marvin & Edmonds, Attorneys.

UNITED STATES PATENT OFFICE.

ARTHUR TREVOR DAWSON AND GEORGE THOMAS BUCKHAM, OF WESTMINSTER, LONDON, ENGLAND, ASSIGNORS TO VICKERS LIMITED, OF WESTMINSTER, ENGLAND.

ORDNANCE BREECH MECHANISM.

1,300,356.     Specification of Letters Patent.     Patented Apr. 15, 1919.

Application filed January 18, 1918. Serial No. 212,500.

*To all whom it may concern:*

Be it known that we, Sir ARTHUR TREVOR DAWSON, knight, and Sir GEORGE THOMAS BUCKHAM, knight, both subjects of the King of Great Britain, residing at Vickers House, Broadway, Westminster, in the county of London, England, have invented certain new and useful Improvements in or Relating to Ordnance Breech Mechanism, of which the following is a specification.

This invention relates to ordnance breech mechanism of the kind comprising a breech screw mounted on the stem or spigot of a swinging carrier and provided with an obturator of the de Bange or similar type between whose axial vent bolt and the carrier stem is interposed a sleeve which bears at its forward end against part of the breech screw and serves as an abutment for the axial vent spring that transmits pressure to the obturator.

According to the invention the carrier stem is formed with a forward prolongation which fits in an axial hole in the forward part of the breech screw, and the sleeve interposed between the said stem and the axial vent bolt of the obturator, has transverse or radial projections which pass through the carrier stem and bear against a stop or shoulder on the said forward part of the breech screw. The said axial hole, which is of comparatively large bore and of one uniform diameter, also receives an enlarged portion on the forward end of the axial vent bolt; the forward end of the said prolongation being disposed contiguous to the said enlarged portion.

In order that the said invention may be clearly understood and readily carried into effect, we will describe the same more fully with reference to the accompanying drawing, in which:—

Figure 1 is a vertical longitudinal section showing a constructional form of our improvements; in the upper half of the figure the sleeve interposed between the carrier stem and the axial vent bolt is shown in section and in the lower half it is shown in elevation.

Fig. 2 is a sectional plan of Fig. 1; in the upper half of this figure the carrier stem is shown in section and in the lower half it is shown in elevation.

Fig. 3 is a rear elevation of the sleeve of Fig. 1 with the carrier stem shown in section on the line 3, 3 of Fig. 1.

A is part of the breech screw, B is the carrier stem and B' is the forward prolongation of this stem fitting in an axial hole A' in the forward part of the breech screw. C is the axial vent bolt and C' is the enlarged portion on the forward end of the axial vent bolt. D is the aforesaid sleeve interposed between the carrier stem and the axial vent bolt and D', D' are the transverse or radial projections on this sleeve. E is the axial vent spring which at its forward end bears against the rear surface of the sleeve D and at its rear end against a collar E' slidably connected by a key and keyway to the axial vent bolt C. The rear surface of this collar bears against a nut $E^2$ on the axial vent bolt. The forward prolongation B' of the carrier stem is in direct contact with the wall of the axial hole A' (no interposed bushing or liner being employed) and the rear part of the breech screw is formed with a hole having the usual interrupted threads engaging with corresponding threads on the carrier stem. The sleeve D is slidably connected to the axial vent bolt by a key and keyway.

In the example shown the transverse or radial projections D', D' on the sleeve D are arranged diametrically opposite each other and pass through longitudinal slots b', b' in the forward end of the prolongation B' of the carrier stem. The forward surfaces of the projections D', D' bear against the forward wall of a large central recess $A^2$ in the breech screw. These projections are situated some distance from the forward end of the sleeve D and the portion of the sleeve in front of the said projections is formed with extensions d', d' of the said projections; these extensions, which are of the same width as the projections D', D' protrude into the longitudinal slots b', b' for a substantial portion of the length of these slots so as to avoid the possibility of the forward slotted end of the carrier stem prolongation being closed in as a result of any unforeseen shocks. The said extensions do not however project radially beyond the slots. The said projections D', D', and the slots b', b' prevent rotation of the sleeve B relatively to the carrier stem and obviate the necessity of providing a key and keyway between the sleeve and the carrier stem.

In assembling the parts the procedure followed in connection with the breech mechanism as at present constructed is adopted, except that the sleeve D is inserted in the carrier stem B prior to the placing of the breech screw in position on the latter. The said sleeve then constitutes an easy guide for the axial vent bolt when the latter is being assembled; this sleeve remains undisturbed when the axial vent bolt is removed for replacing a worn or damaged obturator.

By reason of our improvements we are able to give increased support to the breech screw as near to the front face as is practicable, such increased support being particularly advantageous with heavy breech screws of large caliber ordnance; we are also able to facilitate the forging and internal machining of the breech screw (particularly the machining of the central recess $A^2$) owing to the aforesaid hole A' in the forward portion of the breech screw being of large bore and of one uniform diameter unprovided with shoulders or steps.

What we claim and desire to secure by Letters Patent of the United States is:—

1. In ordnance breech mechanism of the breech-screw carrier type, the combination with the breech screw, the axial vent bolt of said screw, the carrier stem, the spring of the axial vent bolt and a sleeve which is interposed between the axial vent bolt and the carrier stem which sleeve bears against the breech screw and also serves as an abutment for the spring of the axial vent bolt, of a forward prolongation of said carrier stem fitting in an axial hole in the forward part of the breech screw, and a projection on said sleeve passing through said stem and bearing against part of the breech screw behind said prolongation.

2. In ordnance breech mechanism of the breech-screw carrier type, the combination with the breech screw, the axial vent bolt of said screw, the carrier stem, the spring of the axial vent bolt and a sleeve which is interposed between the axial vent bolt and the carrier stem which sleeve bears against the breech screw and also serves as an abutment for the spring of the axial vent bolt, of a forward prolongation of said carrier stem fitting in an axial hole in the forward part of the breech screw, and transverse projections on said sleeve passing through said stem and bearing against part of the breech screw.

3. In ordnance breech mechanism of the breech-screw carrier type, the combination with the breech screw, the axial vent bolt of said screw, the carrier stem, the spring of the axial vent bolt and a sleeve which is interposed between the axial vent bolt and the carrier stem which sleeve bears against the breech screw and also serves as an abutment for the spring of the axial vent bolt, of a forward prolongation of said carrier stem fitting in an axial hole in the forward part of the breech screw and radial projections on said sleeve passing through said stem and bearing against part of the breech screw.

4. In ordnance breech mechanism of the breech-screw carrier type, the combination with the breech screw, the axial vent bolt of said screw, the carrier stem, the spring of the axial vent bolt and a sleeve which is interposed between the axial vent bolt and the carrier stem which sleeve bears against the breech screw and also serves as an abutment for the spring of the axial vent bolt, of a forward prolongation of said carrier stem fitting in an axial hole in the forward part of the breech screw and transverse projections on said sleeve passing through slots formed in the end of said prolongation of the stem and bearing against part of the breech screw.

5. In ordnance breech mechanism of the breech-screw carrier type, the combination with the breech screw, the axial vent bolt of said screw, the carrier stem, the spring of the axial vent bolt and a sleeve which is interposed between the axial vent bolt and the carrier stem which sleeve bears against the breech screw and also serves as an abutment for the spring of the axial vent bolt, of a forward prolongation of said carrier stem fitting in an axial hole in the forward part of the breech screw, transverse projections on said sleeve passing through slots formed in the end of said prolongation of the stem and bearing against part of the breech screw, and further projections on said sleeve protruding into the slots for a substantial portion of their length, these latter projections lying within the outer surface of the said prolongation.

6. In ordnance breech mechanism of the breech-screw carrier type, the combination with the breech screw, the axial vent bolt of said screw, the carrier stem, the spring of the axial vent bolt and a sleeve which is interposed between the axial vent bolt and the carrier stem which sleeve bears against the breech screw and also serves as an abutment for the spring of the axial vent bolt, of a forward prolongation of this stem fitting in an axial hole in the forward part of the breech screw, this hole being of large bore and of one uniform diameter, an enlarged portion on the forward part of the axial vent bolt, this enlarged portion also fitting in the said axial hole, and a projection on said sleeve passing through said stem and bearing against part of the breech screw behind said prolongation.

7. In ordnance breech mechanism of the breech-screw carrier type, the combination with the breech screw, the axial vent bolt of said screw, the carrier stem, the spring of the axial vent bolt and a sleeve which is interposed between the axial vent bolt and the carrier stem which sleeve bears against the breech screw and also serves as an abutment for the spring of the axial vent bolt, of a forward prolongation of this stem fitting in an axial hole in the forward part of the breech screw, this hole being of large bore and of one uniform diameter, an enlarged portion on the forward part of the axial vent bolt, this enlarged portion also fitting in the said axial hole, and transverse projections on said sleeve passing through said stem and bearing against part of the breech screw.

In testimony whereof we hereunto affix our signatures.

ARTHUR TREVOR DAWSON.
GEORGE THOMAS BUCKHAM.

Copies of this patent may be obtained for five cents each, by addressing the "Commissioner of Patents, Washington, D. C."